Jan. 19, 1960

R. H. LEWIS 2,922,112

ELECTRORESPONSIVE DEVICE

Filed May 11, 1956

WITNESSES
Edwin E. Bassler
Wm. B. Sellers.

INVENTOR
Robert H. Lewis
BY
David M. Schiller
ATTORNEY

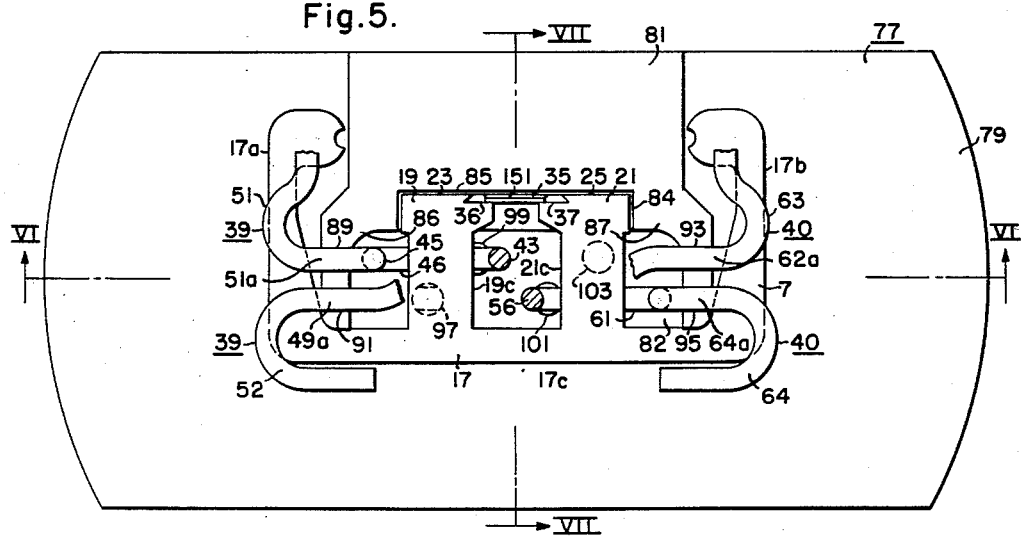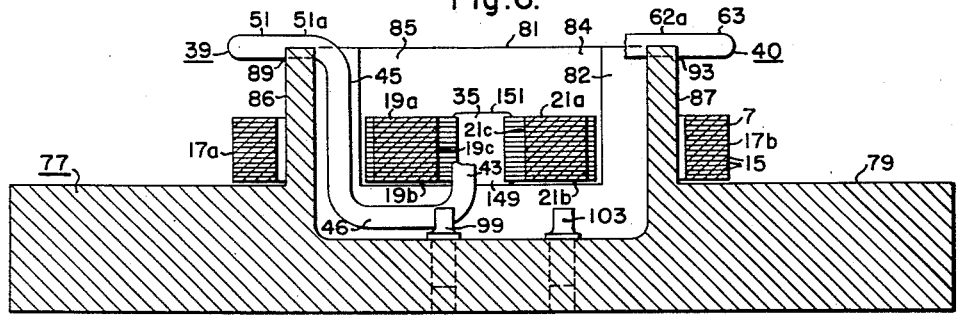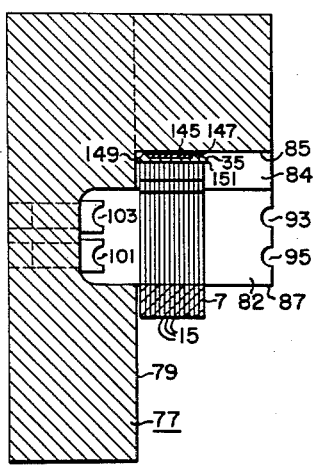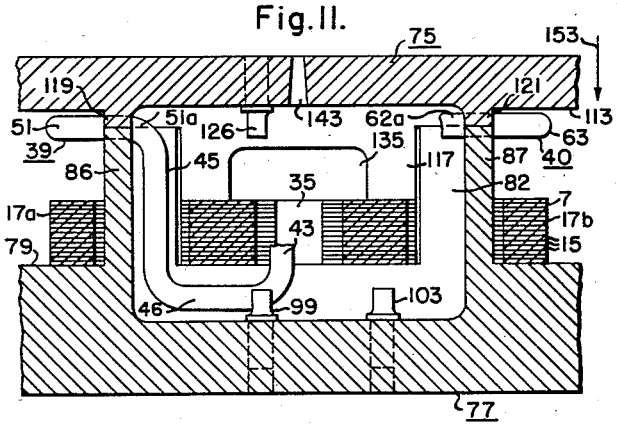

Jan. 19, 1960     R. H. LEWIS     2,922,112
ELECTRORESPONSIVE DEVICE

Filed May 11, 1956     3 Sheets-Sheet 3

United States Patent Office 2,922,112
Patented Jan. 19, 1960

2,922,112

ELECTRORESPONSIVE DEVICE

Robert H. Lewis, West Orange, N.J., assignor to Westinghouse Electric Corporation, East Pittsburgh, Pa., a corporation of Pennsylvania Application May 11, 1956, Serial No. 584,275

7 Claims. (Cl. 324—137)

This invention relates to electroresponsive devices, and has particular relation to a method of securing a magnetic shunt device to a magnetic structure of an electroresponsive device.

Although the invention has many and varied uses, it will be described in connection with electrical watthour meters. Watthour meters have previously been constructed which include a magnetic structure having a voltage magnetic pole and a pair of spaced current magnetic poles spaced from the voltage pole to define an air gap. The meter further includes a voltage winding for the voltage pole and a pair of current windings for the current poles which are effective when energized to establish a shifting magnetic field in the air gap. A suitable electroconductive armature is mounted for rotation relative to the magnetic structure through the air gap under the influence of the shifting field.

It is well known in the art that magnetic overload shunt devices are desirable for watthour meters in order to improve the accuracy of such meters over a large range of load variations. Such shunt devices are ordinarily positioned between the current poles adjacent the air gap for shunting a variable portion of the current flux away from the air gap.

According to the present invention an improved method of securing a shunt device to the magnetic structure of a watthour meter is provided. In the present invention a shunt device is provided which is of deformable construction. In order to secure the shunt device to the magnetic structure the device is initially positioned between the current poles at the desired location. The shunt device is then subjected to a force sufficient to deform the device for forcing material of the device into locking engagement with the magnetic structure.

It has recently been the practice to secure the current coils to the magnetic structure of a watthour meter by a suitable molding process. In the present invention a shunt device is secured to the magnetic structure during performance of the steps involved in a molding process employed for securing the current coils in surrounding relation with the current poles.

In a preferred embodiment of the invention a watthour meter is provided which includes a magnetic structure formed of separate laminated voltage and current magnetic parts. The current part includes a pair of spaced parallel current poles having pole faces positioned in a common plane. A magnetic shunt device is provided for positioning between the current poles which includes a pair of opposed deformable edges. A pair of preformed current coils are provided for positioning about the current poles. The voltage magnetic part includes a voltage pole and is arranged for securement to the current part subsequent to assembly of the current part such that the voltage pole face defines a plane which is spaced from and parallel to the plane of the current pole faces to provide an air gap.

In order to permit molding of the coils to the current poles, a mold assembly of two-part construction is provided. The mold assembly includes upper and lower mold parts with the lower part proportioned to mount the current magnetic part together with the assembled shunt device and current coils in the proper positions relative to each other. Each of the mold parts has a cavity arranged to form a composite mold cavity when the mold parts are in a closed condition which is proportioned to house portions of the coils intermediate the coil terminals. The upper mold part is arranged to close on the lower mold part at portions of the coils in a closing plane which is parallel to and spaced from the plane of the current magnetic part.

According to the invention, the magnetic shunt device is secured to the current magnetic part during closing of the mold assembly. To this end, the shunt device is initially positioned between the current poles with the opposed deformable edges located externally of the space between the current poles to extend along lines substantially parallel to the planes of the laminations of the current part.

In order to secure the shunt device to the current part the current part with the assembled shunt device and coils are positioned in the lower mold part with one of the deformable shunt edges engaging the lower mold part to have the other edge in the closing path of the upper mold part. As the mold assembly is closed a portion of the upper mold part engages the other shunt edge to effect collapse of both edges level with the end laminations of the current part. Such deformation results in the flow of material of the shunt edges into the spaces between the laminations of the current part whereby the shunt device is rigidly and accurately secured to the current part. Such arrangement is further effective to prevent undesirable leakage of the molding material from the composite cavity of the mold assembly during the subsequent molding operation.

It is therefore an object of the inventon to provide an improved electroresponsive device.

It is a further object of the invention to provide an electrical watthour meter of improved construction.

It is a still further object of the invention to provide an improved method of securing a magnetic shunt device between a pair of current magnetic poles of a watthour meter.

It is still another object of the invention to provide a watthour meter having a magnetic shunt device which is secured between a pair of current magnetic poles during the closing operation of a mold assembly employed for molding a pair of current coils to the poles.

Other objects will become apparent from the following description taken in conjunction with the accompanying drawings, in which:

Fig. 5 is a view in top plan of the lower mold part of a two part mold assembly employed in the construction of the meter of Fig. 1;

Fig. 6 is a view in section taken along the line VI—VI of Fig. 5;

Fig. 7 is a view in section taken along the line VII—VII of Fig. 5;

Figs. 11 and 12 are views in section showing the parts of Figs. 8 and 9 in an operative position;

Figure 1:
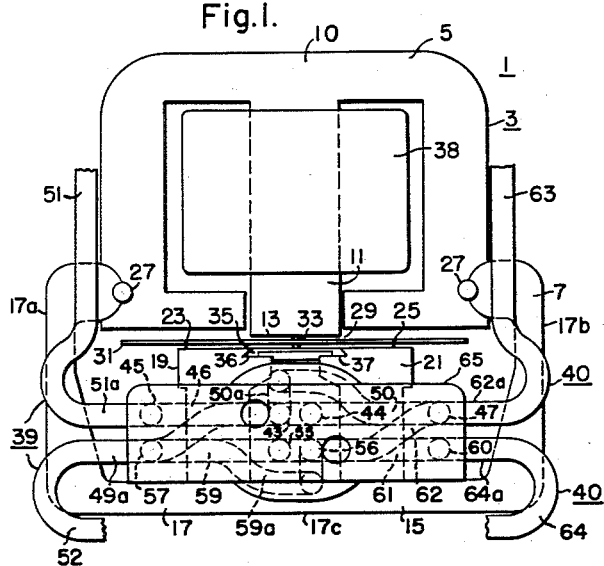
Figure 1 is a view in rear elevation of a watthour meter embodying the teachings of the invention.

Referring to the drawings, there is illustrated in Fig. 1 an electroresponsive device represented generally by the numeral 1 embodying the teachings of the invention. Although the invention may be employed in connection with various devices, it is assumed for purposes of description that the device 1 is an electrical watthour meter of the type utilized for measuring the energy of single phase, three-wire electrical circuits.

The meter 1 includes a magnetic structure 3 which is preferably of multi-part formation. As shown in Fig. 1, the structure 3 includes a voltage magnetic part 5 and a current magnetic part 7. The voltage part 5 is preferably formed of a plurality of magnetic laminations 9 each having the configuration shown in Fig. 1 stacked in a direction transverse to the plane of the paper. The voltage part 5 is of substantially E-shaped configuration with an outer rim 10 having a voltage magnetic pole 11 projecting therefrom which includes a pole face 13.

The current magnetic part 7 is preferably formed of a plurality of magnetic laminations 15 each having the configuration illustrated in Fig. 1 stacked in a direction which is transverse to the plane of the paper. As shown, the current part 7 includes a rim 17 of substantially U-shaped configuration having a pair of spaced arms 17a and 17b connected by a base 17c. The part 7 includes further a pair of spaced current poles 19 and 21 projecting from the base 17c along parallel lines. The pole 19 has opposed faces 19a and 19b connected by a side wall 19c as shown in Fig. 6. Similarly, the pole 21 includes opposed faces 21a and 21b connected by a side wall 21c. The side walls 19c and 21c define the space between the poles 19 and 21. It is observed that the poles 19 and 21 have respectively pole faces 23 and 25 located substantially in a common plane. The parts 5 and 7 may be secured together in any suitable manner such as by rivets 27 which extend through openings of the parts 5 and 7 which are formed by engaging surfaces of such parts. It is observed that the parts 5 and 7 are secured together with the plane of the pole faces 23 and 25 spaced from and parallel to the plane of the pole face 13 to define an air gap 29.

The meter 1 includes further an electroconductive armature preferably in the form of a disc 31 which is mounted for rotation by a shaft 33 through the air gap 29 relative to the structure 3. In order to provide overload compensation, as is understood in the art, a suitable magnetic shunt device 35 is positioned between the current poles 19 and 21. For this purpose the poles 19 and 21 have respectively slots 36 and 37 which extend between the faces 19a and 19b and 21a and 21b in a plane transverse to the plane of the laminations 15 for receiving the shunt device 35. Details of construction of the shunt device 35 will be set forth hereinafter.

In order to permit energization of the meter 1 for effecting rotation of the disc 31 in accordance with energy of an electrical energizing circuit (not shown), a plurality of energizable windings for the several poles 11, 19 and 21 are provided. For this purpose, a voltage winding 38 surrounds the voltage pole 11 which preferably includes a large number of turns of small cross section wire. The winding 38 is arranged for energization in accordance with voltage of the circuit (not shown) to produce an alternating voltage magnetic flux.

Figure 4:
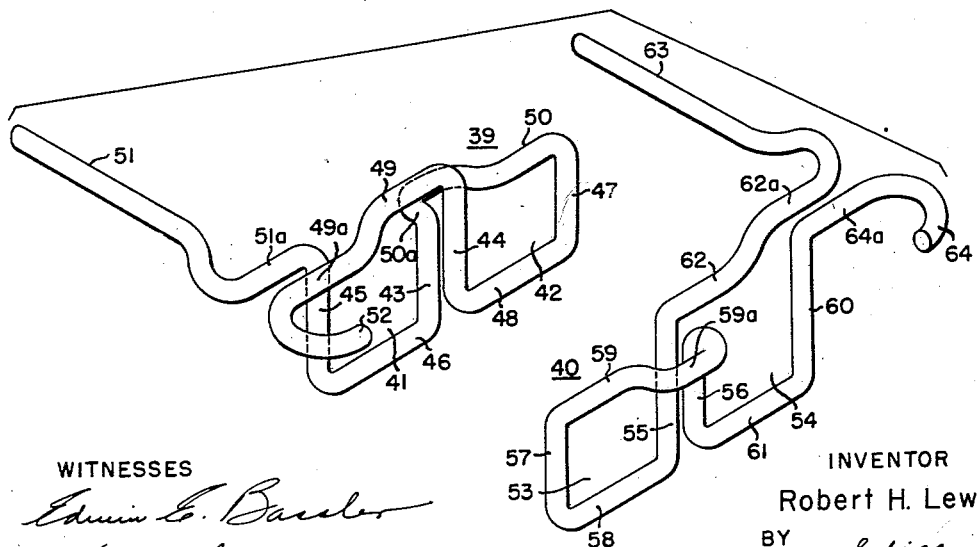
Fig. 4 is a view in perspective of a pair of current coils for the meter of Fig. 1.

A pair of current windings 39 and 40 each having the configuration illustrated in Fig. 4 are provided to surround the current poles 19 and 21. The windings 39 and 40 are arranged for energization in accordance with currents of the circuit (not shown) to produce alternating current fluxes which cooperate with the voltage magnetic flux to establish a shifting magnetic field in the air gap 29. As is understood in the art, the shifting field so established effects rotation of the disc 31 relative to the structure 3 in accordance with energy of the circuit (not shown). The windings 39 and 40 may be arranged to permit the measurement of energy of single phase, three-wire circuits with each winding energizable in accordance with current of a separate wire of the circuit (not shown).

As illustrated in Fig. 4 each of the windings 39 and 40 is constructed to have a substantially figure-of-eight configuration. The windings are preferably formed of rigid, self-supporting, deformable electroconductive wire, such as copper, of circular cross sectional area. However, the wire may have other configurations, such as a rectangular cross section. In order to construct the winding 39 a suitable length of wire is deformed to provide a coil of figure-of-eight configuration having a pair of loops defining openings 41 and 42 joined by a central bar section consisting of parallel coil portions 43 and 44 which lie in a common plane. The coil further includes a side portion 45 and a linking portion 46 which with the portion 43 define the opening 41. It is observed that the coil portions 45 and 46 lie in the plane defined by the coil portions 43 and 44. The opening 42 is defined by a side portion 47, a linking portion 48 and the portion 44 with the portions 47 and 48 lying in the plane of the portions 43 and 44. The openings 41 and 42 are effectively closed by a coil portion 49 and a linking portion 50 respectively which include parts 49a and 50a displaced from the plane of the coil to clear the coil portions 45 and 44. It is observed that the coil 39 includes terminal portions 51 and 52 which are located at one end of the coil spaced in a direction transverse to the plane of the coil. The terminals 51 and 52 are connected to the loops 41 and 42 by connecting portions 51a and 49a which define a plane transverse to the plane of the loops.

The winding 40 is of the same general figure-of-eight configuration as the winding 39 but is shaped to satisfy space and connection requirements of the meter when the windings are operatively positioned. As shown in Fig. 4 the coil 40 includes a pair of loops defining openings 53 and 54 joined by a bar section formed of parallel central coil portions 55 and 56. The coil 40 also includes transverse portions 57 and 58 which with the portion 55 define the opening 53. The opening 53 is effectively closed by coil portion 59 which includes a part 59a displaced from the plane of the coil to clear the coil portion 55. The opening 54 is effectively formed by the coil portions 56, 60, 61 and 62 with the portion 62 having a part 62a which is displaced from the plane of the coil to clear the coil portion 60. The coil 40 includes a terminal portions 63 and 64 which are connected to the loops 53 and 54 by portions 62a and 64a which define a plane transverse to the plane of the loops. The terminals are located at one end of the coil spaced in a direction transverse to the plane of the coil.

Figure 3:
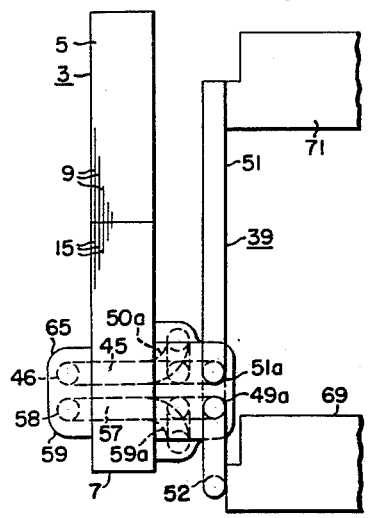
Fig. 3 is a view in side elevation of the meter of Fig. 1 with parts removed.
Figure 2:
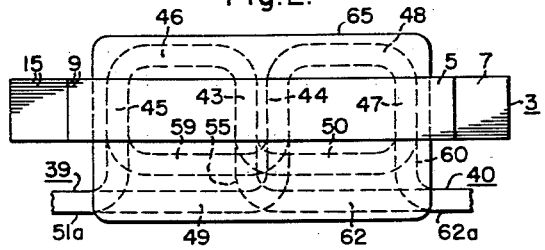
Fig. 2 is a view in top plan of the meter of Fig. 1 with parts removed.

The coils 39 and 40 are positioned relative to the poles 19 and 21 in the manner best shown in Figs. 1, 2 and 3. As there shown the coil 40 is initially located to surround the poles 19 and 21 such that the poles 19 and 21 extend respectively through the openings 53 and 54 of the coil. The coil 40 is further positioned with the terminals 63 and 64 located at the rear side of the structure 3 adjacent the right-hand end of the structure 3 as viewed in Fig. 1. The coil 39 is positioned above the coil 40 with the poles 19 and 21 extending respectively through the openings 41 and 42 to have the terminals 51 and 52 located at the rear side of the structure 3 adjacent the left-hand side of the structure 3 as viewed in Fig. 1. With this arrangement the coils 39 and 40 are positioned in parallel planes transverse to the plane of the structure 3.

As shown in Fig. 4 the coils 39 and 40 are proportioned such that the portion 49a of the coil 39 may be positioned in front of the portion 59 of the coil 40 in the plane of the coil 40 as viewed in Fig. 1. The coils are further designed so that the portion 50 of the coil 39 may be positioned behind the portion 62a of the coil 40 in the plane of the coil 40 as viewed in Fig. 1. The coils are embedded in a suitable insulating body 65 in spaced parallel planes with the portions 51a and 62a of the coils emerging from the body 65 along a line which is spaced from and parallel to a line along which the portions 49a and 64a of the coils emerge from the body 65. These lines of emergence lie in a common plane which is spaced from and parallel to the plane of the structure 3. According to the invention the body 65 is molded about the coils by an improved molding process details of which will be described hereinafter.

The several terminals of the coils may be connected to the circuit (not shown) in any suitable manner. For example, the meter 1 may be of the detachable type including a pair of contact blades 69 and 71 which are connected to the terminals 52 and 51 of the coil 39 respectively. The blades 69 and 71 may be arranged for detachable engagement with suitable contact jaws of the socket structure (not shown) for connection to the circuit (not shown). A similar arrangement may be employed for the coil 40.

The coils 39 and 40 are conveniently secured to the current part 7 to surround the poles 19 and 21 by a molding process wherein a mold assembly of two-part construction is employed. A mold assembly which is suitable for purposes of the present invention is illustrated in detail in Figs. 5 through 10, inclusive. As there shown, a mold assembly is provided which includes two parts 75 and 77 designated hereinafter respectively as upper and lower mold parts. The lower mold part 77 is illustrated in Figs. 5, 6 and 7 as including a base surface 79 having a central raised section 81 which includes a cavity 82 extending into the base surface 79 as shown in Fig. 6. The raised section 81 further includes a cavity 84 having a side wall 85 and an end wall defined by the surface 79 for communication with the cavity 82. The cavity 84 forms a part of a composite mold cavity when the parts 75 and 77 are in a closed condition as will appear hereinafter.

The raised section 81 includes a pair of spaced leg portions 86 and 87 which form side walls for the cavity 82. The leg portions 86 and 87 are provided with a plurality of spaced grooves for the purpose of receiving portions of the coils 39 and 40 to assist in supporting such coils during the molding operation. For this purpose, the leg portion 86 includes a pair of spaced grooves 89 and 91 for receiving respectively spaced portions 51a and 49a of the coil 39, whereas the leg portion 87 includes spaced grooves 93 and 95 for receiving respectively spaced portions 62a and 64a of the coil 40.

As shown in Figs. 5, 6 and 7, the lower mold part 77 includes a plurality of slotted support pins 97, 99, 101 and 103 positioned within openings of the part 77 to project into the cavity 82 for the purpose of further assisting in supporting the coils in proper positions during the molding process. To this end, the pins 99 and 103 are positioned to receive respectively portions 46 and 48 of the coil 39, whereas the pins 97 and 101 are positioned respectively to receive portions 58 and 61 of the coil 40 when the coils are properly positioned relative to the mold part 77.

Figure 8:
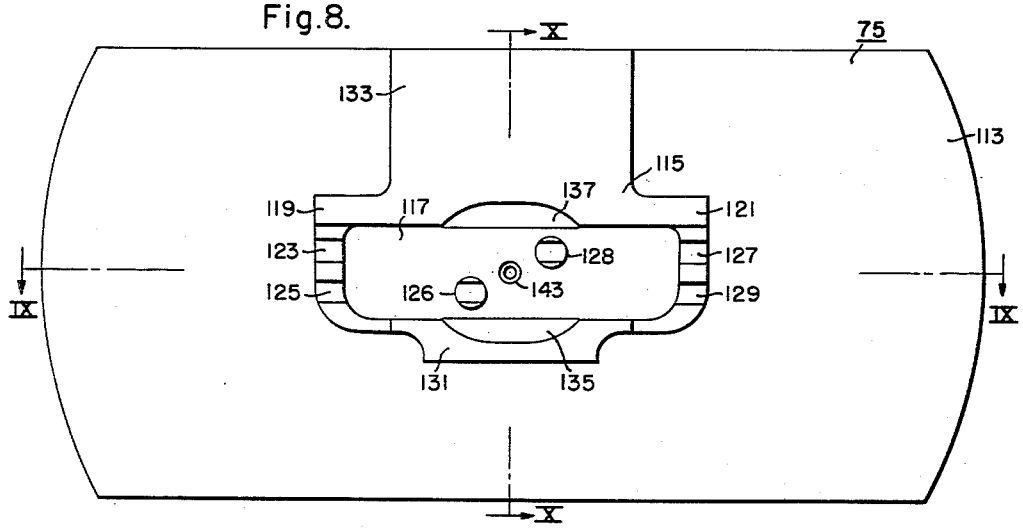
Fig. 8 is a view in bottom plan of the upper mold part of the mold assembly employed in the construction of the meter of Fig. 1.
Figure 9:
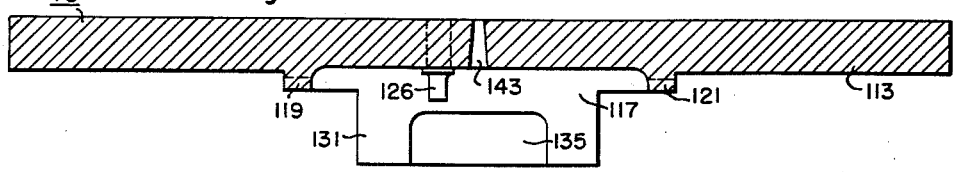
Fig. 9 is a view in section taken along the line IX—IX of Fig. 8.
Figure 10:
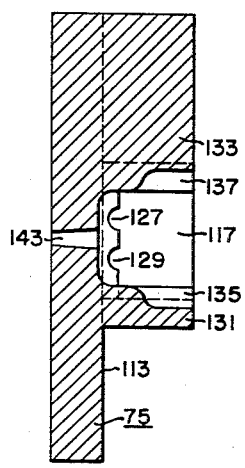
Fig. 10 is a view in section taken along the line X—X of Fig. 8.

Details of construction of the upper mold part 75 are illustrated in Figs. 8, 9 and 10. As there shown, the part 75 includes a base surface 113 having a central raised section 115 which includes a cavity 117 extending into the surface 113 as shown in Fig. 9. As will presently appear, the cavity 117 forms with the cavity 82 of the part 77 a composite mold cavity when the parts 75 and 77 are in a closed condition. The section 115 includes a pair of spaced leg portions 119 and 121 which define side walls for the cavity 117. The leg portions 119 and 121 are positioned to engage respectively the leg portions 86 and 87 of the part 77 when the parts 75 and 77 are in a closed condition.

For this purpose the leg portion 119 includes spaced grooves 123 and 125 to receive respectively the portions 49a and 51a of the coil 39 when the mold parts are in the closed condition. In a similar manner, the leg portion 121 includes spaced grooves 127 and 129 for receiving respectively the portions 64a and 62a of the coil 40 when the mold parts are in such closed condition. The mold part 75 further includes a pair of slotted support pins 126 and 128 positioned within openings of the part 75 to extend into the cavity 117 for receiving respectively the portion 49 of the coil 39 and the portion 62 of the coil 40 when the mold parts are in the closed condition.

It is observed that the section 115 includes portions 131 and 133 spaced by the cavity 117 which have surfaces positioned in a common plane spaced from the planes of the surfaces of the leg portions 119 and 121. The portions 131 and 133 include respectively opposed pockets 135 and 137 which open toward each other for communication with the cavity 117. The pockets 135 and 137 are proportioned to receive respectively the displaced portion 50a of the coil 39 and the displaced portion 59a of the coil 40 when the mold assembly is in a closed condition. It is further observed that the mold part 75 includes an opening 143 communicating with the cavity 117 through which the molding material 65 is introduced as will be described hereinafter.

It will be recalled that a shunt device 35 is positioned between the current poles 19 and 21 adjacent the air gap 29. For low energizations of the coils 39 and 40 the device 35 is designed to operate in an unsaturated condition and, consequently, shunts a substantial percentage of the magnetic flux produced by energization of these coils away from the air gap. As the energization of the coils increase the device 35 begins to saturate and as it does so, a smaller proportion of the magnetic flux produced by energization of the coils 39 and 40 is shunted away from the air gap. This compensates for the well-known tendency of the meter to operate too slowly at larger energizations of the current coils. By proper selection of the proportions of the shunt device, rotation of the disc 31 can be substantially proportional to the power measured by the meter over a large range of variations of power.

Figure 13:
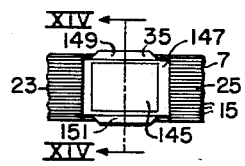
Fig. 13 is a view in top plan of a portion of the meter of Fig. 1 with parts broken away.
Figure 14:
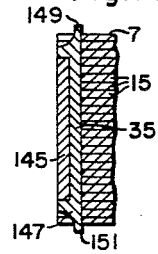
Fig. 14 is an enlarged view in section taken along the line XIV—XIV of Fig. 13.
Figure 15:
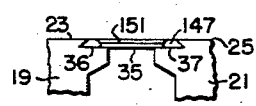
Fig. 15 is a view in elevation of a portion of the meter 1 with parts broken away.

A shunt device suitable for purposes of the present invention is conveniently constructed according to the method described in application Serial No. 422,295 filed on April 12, 1954, by F. W. Witte and assigned to the assignee of the present invention, now U.S. Patent No. 2,813,253 dated November 12, 1957. A shunt device so constructed is illustrated in Figs. 13, 14 and 15. As there shown, the device 35 includes a magnetic plate 145 which may be constructed of any suitable magnetic material such as cold rolled steel. The plate 145 is embedded in a carrier 147 which is molded about the plate 145 according to the method disclosed in the above referred to application. Any suitable deformable material may be employed for the carrier 147. The carrier is preferably formed of a die-casting metallic alloy which is readily deformable when in a solid state in response to the application of forces considerably greater than those encountered under normal operating conditions of the meter. For example, the material of the carrier may comprise a low-melting-point lead-base alloy.

According to the invention, the shunt device 35 is secured to the current magnetic part 7 in an operative position during performance of the steps involved in the process of molding the current coils to the current poles. For this purpose, the shunt device 35 is formed with a pair of opposed side edges 149 and 151 which constitute portions of the carrier 147 as shown in Figs. 13, 14 and 15. The shunt device 35 is formed according to the invention with a cross-section having the configuration shown in Fig. 14. In Fig. 14 there is illustrated a section taken in a plane transverse to the plane of the shunt device which includes a line connecting the edges 149 and 151. It is observed that the edges 149 and 151 have thickness dimensions less than the thickness dimension of the central portion of the carrier. As shown in Fig. 13 the side edges have length dimensions which terminate short of the end edges of the carrier 147. The edges 149 and 151 are proportioned such that they may be located externally of the space between the poles 19 and 21 to extend along lines substantially parallel to the planes of the laminations 15 when the shunt device is properly positioned with respect to the current poles as shown in Fig. 13.

The shunt device is initially applied to the current part 7 by wedging it between the current poles so that the edges 149 and 151 are positioned as described. During the wedging operation the material of the end edges of the carrier flows between the laminations 15 with the result that the shunt device is interlocked with the laminations 15. As will presently appear the arrangement of the shunt device prevents undesirable leakage of the molding material from the composite cavity of the mold assembly during the molding operation.

The operations required to mold the current coils to the current part 7 may now be described. The coils 39 and 40 and the shunt device 35 are applied to the current part 7 in the manner previously described. This entire assembly is then positioned relative to the lower mold part 77 as illustrated in Figs. 5 and 6. As there shown, the current part 7 is positioned to engage the base surface 79 in a plane parallel to the plane of the surface 79 such that the leg portions 86 and 87 extend respectively between the pole 19 and the arm 17a and between the pole 21 and the arm 17b. The enlarged terminal portions of the current poles are positioned in the cavity 84 with the pole faces 23 and 25 in engagement with the side wall 85. The coil 39 is then adjusted such that the portions 46 and 48 are located respectively in the slots of the pins 99 and 103, and such that the portions 51a and 49a are positioned within the grooves 89 and 91 respectively. In a similar manner, the coil 40 is adjusted such that the portions 58 and 61 are positioned respectively within the slots of the pins 97 and 101, and such that the portions 62a and 64a are located respectively in the grooves 93 and 95. With such arrangement, the portions of the coils which are intermediate the associated terminals are located within the cavity 82 of the section 81.

The mold parts 75 and 77 are initially positioned in alignment along a line extending transverse to the surfaces 79 and 113 of the mold parts. In order to effect closing of the mold assembly the upper mold part 75 is moved relative to the lower mold part 77 along the line of alignment in the direction of the arrow 153 shown in Figs. 11 and 12. As the part 75 moves toward the part 77, the portion 131 of the part 75 will strike the exposed edge 151 of the shunt device 35. Continued movement of the mold part 75 results in the collapse of both of the edges 149 and 151 of the shunt device level with the associated end laminations of the part 7. Such deformation of the edges 149 and 151 results in the flow of the material of the edges into the slots 36 and 37 and in the spaces between the laminations 15 of the current part 7. Consequently, the carrier 147 is interlocked with the laminations 15 by means of the side edges and the end edges of the carrier whereby the shunt device is rigidly and accurately secured to the current part 7 in an operative position.

Figure 12:
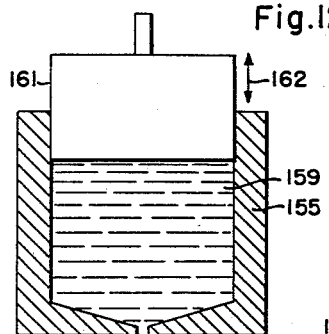

Referring to Figs. 11 and 12 the mold assembly is shown in the closed condition to permit the molding operation. It is observed that in such condition the upper mold part 75 is positioned with the portion 131 within the cavity 84 in engagement with the collapsed edge 151 of the shunt device and parts of the associated end lamination of the current part 7. The portion 133 of the mold part 75 engages an additional part of the associated end lamination. The shunt device 35 is illustrated in Fig. 12 with the side edges 149 and 151 in the collapsed condition. It is observed that deformation of the side edges results in the formation of ridges 147a and 147b which are displaced from the plane of the carrier.

The leg portions 119 and 121 of the mold part 75 engage respectively the leg portions 86 and 87 of the mold part 77 such that the grooves 123 and 125 form respectively with the grooves 91 and 89 spaced openings for receiving the portions 49a and 51a of the coil 39, and the grooves 127 and 129 form with the grooves 95 and 93 spaced openings for receiving the portions 64a and 62a of the coil 40. The pins 126 and 128 engage respectively the portions 49 and 62 of the coils 39 and 40 to assist in maintaining the coils in operative positions. It is observed that the plane of engagement of the mold parts 75 and 77 is parallel to the plane of the current part 7 to intersect the connecting portions 51a, 49a, 62a and 64a of the coils. With this arrangement the mold parts close on such connecting portions at points thereof which are included in lines extending transverse to the plane of the part 7 intermediate the pole 19 and the arm 17a and the pole 21 and the arm 17b.

When the mold assembly is in a closed condition as shown in Figs. 11 and 12, a suitable molding material 65 may be introduced into the composite mold cavity through the opening 143 in any suitable manner. For example, the molding material 65 may be contained in a tank 155 having a nozzle 157 communicating with the opening 143. The molding material 159 which forms the body 65 may be transferred from the tank 155 to the mold cavity by actuation of a suitable plunger 161 which is mounted for reciprocation in the direction of the double headed arrow 162.

Any suitable insulating material may be employed in the molding operation. Preferably, the material 159 comprises a polyester resin which is introduced into the mold cavity from the tank 155 in a fluid condition under suitable heat and pressure conditions. When the fluid material entirely fills the mold cavity, it completely surrounds portions of the coils which are intermediate the coil terminal portions to engage portions of the current part 7. Subsequent to introduction of the material 159 into the mold cavity, it is allowed to attain a solid state at which time the mold parts 75 and 77 may be separated to expose the assembled electromagnetic structure.

It is noticed that by means of the invention the shunt device 35 is rigidly and accurately secured to the current part 7 during closing of the mold assembly. Furthermore, the arrangement is such that leakage of the molding material from the mold cavity during the subsequent molding operation is prevented. In addition, the material 159 may engage the ridges 147a and 147b such that the solid body formed from the material 159 and the ridges are in interlocking engagement to assure a rigid assembly.

Although the invention has been described with reference to certain specific embodiments thereof, numerous modifications are possible, and it is desired to cover all modifications falling within the spirit and scope of the invention.

I claim as my invention:

1. The method of securing a magnetic shunt device to a magnetic structure having a pair of spaced parallel magnetic extensions, each of said extensions having opposed faces connected by a side wall with the side walls defining the space between said extensions, each of said side walls having a slot extending substantially transverse to said faces to open at one of the associated faces with the slots lying in a common plane, said method comprising the steps of forming a magnetic shunt device with a deformable side edge and end edges, positioning the shunt device between said extensions within said slots with said end edges substantially abutting said extensions, adjusting the shunt device to locate the shunt device in its desired final operative position between the extensions whereby the side edge projects externally of the space between the extensions, and of thereafter forcing material of the deformable side edge into said slots in engagement with said extensions while maintaining the shunt in its adjusted position.

2. The method of securing a magnetic shunt device to a magnetic structure having a pair of spaced parallel laminated magnetic extensions, each of said extensions having opposed faces connected by a side wall with the side walls defining the spaces between said extensions, said laminations defining first planes parallel to said faces, each of said side walls having a slot extending transverse to said first planes to open at one of the associated faces with the slots lying in a common plane, said method comprising the steps of forming a magnetic shunt device with a deformable side edge and opposite end edges, positioning the shunt device between said extensions within the slots with said end edges substantially abutting said extensions to have said side edge extend along a line substantially parallel to said first planes, adjusting the shunt device to locate the shunt device in its final operative position between the extensions whereby the side edge projects externally of the space between the extensions, and of thereafter applying a force to the shunt device acting uniformly over the deformable side edge in a direction transverse to said first planes for collapsing the side edge level with the adjacent face while maintaining the shunt in its adjusted position.

3. The method of securing a magnetic shunt device to a magnetic structure having a pair of spaced parallel laminated magnetic extensions, each of said extensions having opposed faces connected by a side wall with the side walls defining the space between said extensions, said laminations defining first planes parallel to said faces, each of said side walls having a slot extending transverse to said first planes between said faces with the slots lying in a common plane, said method comprising the steps of forming a magnetic shunt device with a pair of opposed deformable side edges and a pair of opposed end edges, positioning the shunt device between said extensions within the slots to have said end edges engaging said side walls and said side edges extend along lines substantially parallel to said first planes, adjusting the shunt device to locate said side edges externally of the space between the extensions, positioning backing support means in engagement with one of said side edges, and applying a force to the shunt device acting uniformly over the other of said side edges in a direction transverse to said first planes for collapsing both of said side edges level with the adjacent faces.

4. The method of securing a magnetic shunt device to a magnetic structure having a pair of spaced parallel magnetic extensions, each of said extensions having opposed faces connected by a side wall with the side walls defining the space between said extensions, each of said side walls having a slot extending substantially transverse to said faces to open at one of the associated faces with the slots lying in a common plane, said method comprising the steps of forming a magnetic shunt device with a deformable edge, positioning the shunt device between said extensions within said slots to have said edge extend along a line substantially parallel to said faces, adjusting the shunt device to locate the edge externally of the space between the extensions, forming a mold assembly having a pair of separable mold parts for molding an electroconductive winding in surrounding relation with the extensions, positioning the assembled magnetic structure, shunt device and winding within one of the mold parts with the shunt deformable edge spaced from said one mold part, and effecting movement of the mold parts into operative positions to cause engagement of the other of the mold parts with said edge for collapsing said edge level with the adjacent face.

5. The method of securing a magnetic shunt device to a magnetic structure having a pair of spaced parallel laminated magnetic extensions, each of said extensions having opposed faces connected by a side wall with the side walls defining the space between said extensions, said laminations defining first planes parallel to said faces, each of said side walls having a slot extending transverse to said first planes between said faces with the slots lying in a common plane, said method comprising the steps of forming a magnetic shunt device with a pair of opposed deformable edges, positioning the shunt device between said extensions within the slots to have said edges extend along lines substantially parallel to said first planes, adjusting the shunt device to locate said edges externally of the space between the extensions, forming a mold assembly having a pair of separable mold parts each with a separate surface for molding an eletroconductive winding in surrounding relation with the extensions, positioning the assembled magnetic structure, shunt device and winding on one mold part with said first planes parallel to said one mold part surface to have one of the deformable edges engage said one mold part surface, positioning the mold parts in alignment along a line transverse to said mold part surfaces, effecting relative movement between the mold parts in a closing direction along said line to cause engagement of the surface of the other mold part with the other of said deformable edges, and continuing such relative movement until said deformable edges are collapsed level with the extension faces such that said mold part surfaces engage said faces.

6. The method of assembling a current electromagnetic structure of a watthour meter comprising the steps of forming a magnetic structure with a pair of spaced parallel laminated current poles, each of said poles having opposed faces connected by a side wall with the side walls defining the space between said poles, said laminations defining first planes parallel to said faces, each of said side walls having a slot extending transverse to said first planes between said faces with the slots lying in a common plane, forming a magnetic shunt device with a pair of opposed deformable edges, positioning the shunt device between said poles within said slots with said deformable edges extending along first lines substantially parallel to said first planes, adjusting the shunt device to locate said edges externally of the space between said poles, positioning an electroconductive winding in surrounding relation with said poles, forming a mold assembly having a pair of separable mold parts each with a separate surface, each of said mold parts having a cavity with the cavities forming a composite mold cavity when the mold parts are in a closed condition, positioning the assembled magnetic structure, shunt device and winding on one mold part with said first planes parallel to said one mold part surface to have one of the deformable edges engage said one mold part surface with said winding within the cavity of said one mold part, positioning the mold parts in alignment along a line transverse to said mold part surfaces, effecting relative movement between the mold parts in a closing direction along said line to cause engagement of the surface of the other mold part with the other of the deformable edges, continuing such relative movement until said deformable edges are collapsed level with said faces such that said mold part surfaces engage said faces to form said composite cavity, and introducing a hardenable fluid insulating molding material into said composite cavity to surround said winding in engagement with the magnetic structure.

7. In a shunt device for positioning between a pair of spaced laminated current poles of a watthour meter, a deformable carrier, and a magnetic shunt substantially embedded in the carrier, said carrier having a central portion spacing a pair of opposed side edges, and spacing a pair of opposed end edges, said side edges having thickness dimensions less than the thickness dimension of said central portion, each side edge having an intermediate portion terminating short of said end edges and having end portions adjacent said end edges, said shunt device being arranged for positioning between said poles with said end edges in engagement with said poles to have said side edges spaced in a direction transverse to the direction of spacing of said poles, said carrier being proportioned such that said intermediate portions of said side edges project beyond the end laminations of the poles and said end portions of said side edges terminate within the end laminations of the poles when the shunt device is positioned between the poles.

References Cited in the file of this patent

UNITED STATES PATENTS

| | | |
|---|---|---|
| 1,699,777 | Callsen | Jan. 22, 1929 |
| 1,856,555 | Harris | May 3, 1932 |
| 2,655,717 | Dunn | Oct. 20, 1953 |
| 2,656,512 | Lenehan | Oct. 20, 1953 |
| 2,677,875 | White | May 11, 1954 |
| 2,813,253 | Witte | Nov. 12, 1957 |